Patented Aug. 15, 1933

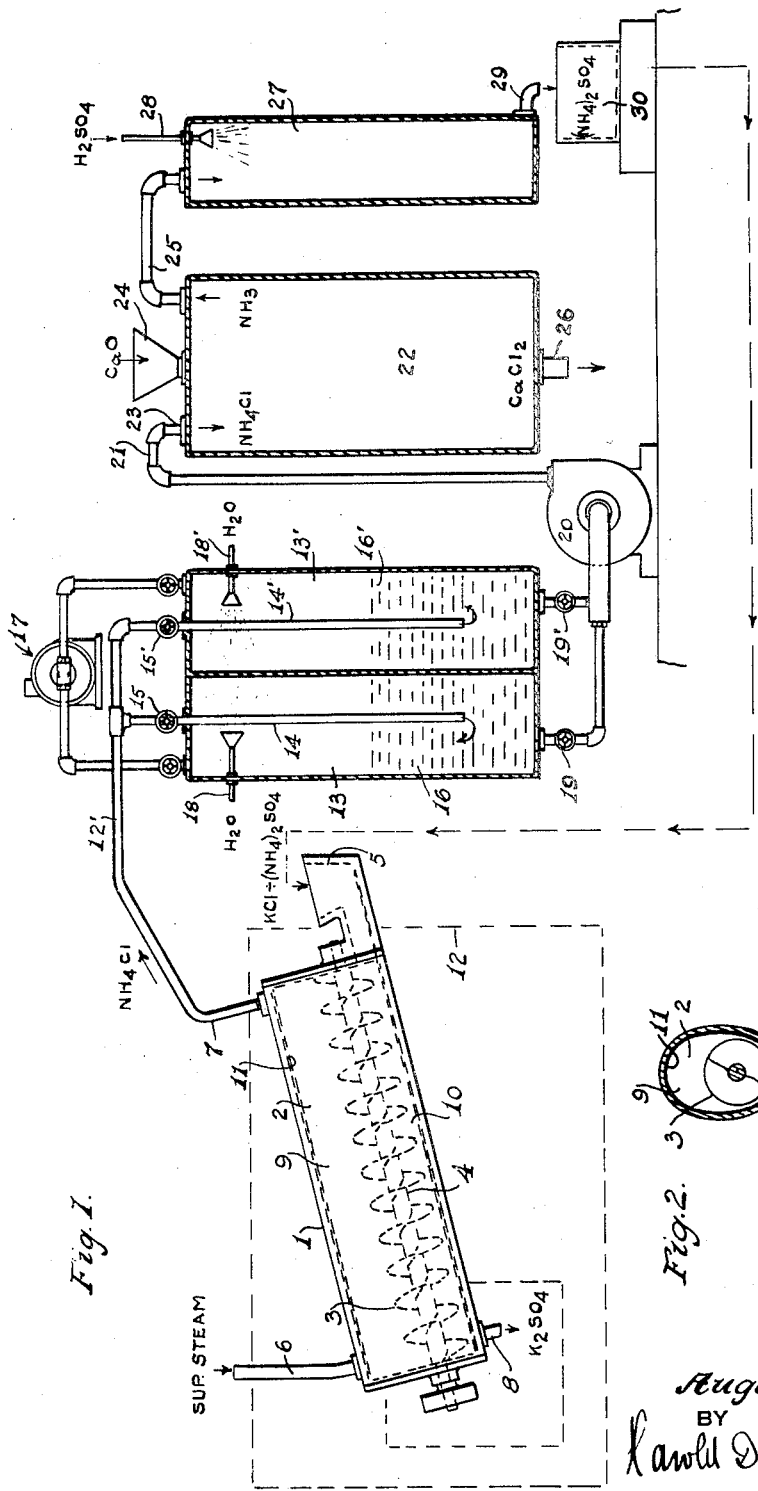

1,922,682

UNITED STATES PATENT OFFICE 1,922,682

METHOD OF CONVERTING POTASSIUM CHLORIDE INTO POTASSIUM SULPHATE

August Holz, Irvington, N. J.

Application August 15, 1931. Serial No. 557,200

1 Claim. (Cl. 23—121)

My present invention relates to a method of, and means for, converting potassium chloride into the corresponding sulphate and nitrate salts.

In my co-pending application Serial No. 476,449, filed August 19, 1930, there is disclosed a commercially practical method of producing potassium nitrate. The latter method is dependent, however, upon an economical supply of potassium sulphate. As is well known, chloride of potassium is readily available in large quantities at relatively economical prices. It will, therefore, be seen that a successful method of converting potassium chloride to the sulphate of potassium would be of great value to the method described in said co-pending application.

Now, I have discovered a commercially feasible, and highly novel, process of, and devised means for, effecting the conversion of potassium chloride into potassium sulphate, while simultaneously utilizing by-products of the conversion to produce an essential ingredient of conversion reaction mixture.

Accordingly, it may be stated that it is one of the main objects of my present invention to provide a method of, and means for, treating potassium chloride consisting in reacting the latter with ammonium sulphate, the reaction being maintained at a temperature above the volatilization point of ammonium chloride and below the melting point of potassium sulphate, treating the condensed ammonium chloride to liberate ammonia, and utilizing the latter to form additional ammonium sulphate thereby establishing a complete production cycle.

Another important object of this invention is to provide an apparatus for economically effecting the present conversion process in a continuous cycle, the apparatus generally comprising a conversion chamber designed to receive the reaction materials at one end thereof and slowly feed the reacting materials towards a point where the desired converted material is delivered, the chamber being arranged to permit reaction gaseous products to escape at a point remote from said delivery point, and additional means, including a gas condensing device, for utilizing the said gaseous products to produce one of said reaction materials.

Another object of this invention is to provide in combination with a novel method of converting potassium chloride into potassium sulphate, the step of utilizing the latter in the production of potassium nitrate.

Still other objects of the present invention are to provide a novel method of converting potassium chloride into potassium sulphate, the latter being used for the production of potassium nitrate, thereby creating an economical source of materials for said nitrate production, and to, moreover, carry out said conversion process in a simple, and efficient aparatus wherein the conversion proceeds in a continuous manner by virtue of the complete utilization of conversion by-products.

The novel features which I believe to be characteristic of my invention are set forth in particularty in the appended claim, the invention itself, however, as to both its apparatus and method of operation will best be understood by reference to the following description taken in connection with the drawing in which I have schematically indicated an apparatus whereby my invention may be carried into effect.

In the drawing:

Fig. 1 is a schematic representation of an arrangement for carrying out the present process;

Fig. 2 is a detail view of a section of the conversion chamber.

Referring, now, to the accompanying drawing in which like characters of reference indicate the same parts in the two figures, the flow sheet diagram of Fig. 1 shows a conversion chamber 1, preferably made of iron, in the form of a long, inclined, fixed cylinder. The latter has disposed within its interior 2, a helical feeding device 3, the latter being mounted upon an inclined shaft 4. The shaft is rotatably supported in bearings at opposite ends of the chamber 1, and driven by any well known means (not shown). It is not believed necessary to describe the feed device in any further detail since those skilled in the art are acquainted with this expedient for slowly transporting a reacting mixture from one end of a chamber to another.

The higher end of the chamber 1 is provided with an opening, equipped with a feed hopper 5 at the lower portion of said end, if desired, to receive predetermined quantities of the potassium chloride and ammonium sulphate. The chamber is maintained at a predetermined reaction temperature by any desired means. Superheated steam may be injected into the interior of the chamber at the lower end thereof through an opening 6 provided above the helical feed 3 for moving gases. The reaction temperature is such that the conversion proceeds according to the following equation:

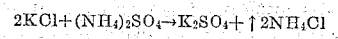

$$2KCl + (NH_4)_2SO_4 \rightarrow K_2SO_4 + 2NH_4Cl\uparrow$$

The temperature is above the volatilization point of the ammonium chloride, but far below the melting point of the potassium sulphate. An outlet 7 is, thus, provided at the upper end of the chamber, above the helical feed, whereby the volatilized ammonium chloride readily escapes from the conversion chamber. On the other hand, an outlet 8 is provided at the lower end of the chamber, below the helical feed, to permit the delivery of potassium sulphate. The latter is delivered in a pulverulent state.

It will, then, be seen that the helical feed 3 continuously, and slowly, moves the reacting chloride and sulphate towards the outlet 8, the feeding action resulting in intimate mixture of the reacting materials. In order to permit ready escape of ammonium chloride fumes at any point along the length of the chamber, the helical device 3 is eccentrically disposed with respect to the axis of the cylinder. Fig. 2 shows, in detail, the manner in which this is done. The cylinder has an elliptical cross-section, and due to the said eccentric arrangement, a considerable space 9 is provided between the upper side of the cylinder and the helical drive between inlet 6 and outlet 7, while little clearance 10 is provided between the lower side of the cylinder and the helical drive between the outlet 8 and hopper 5.

The cylinder 1 is provided with a siliceous lining 11. The inlet 6 while admitting steam for aiding removal of volatilized ammonium chloride from the chamber, may admit air under pressure, and a mixture of air and steam may even be used. A brick vault may be constructed about the chamber 1 to confine the heat, the dotted lines 12 conventionally representing such an arrangement. If desired oil burners (not shown) may be utilized within the brick vault to provide reaction heat.

It is to be understood that the supply of materials to the hopper 5 is maintained at a constant rate, while the speed of the helical device 3 is regulated to deliver a predetermined quantity of pulverulent potassium sulphate per desired unit of time. The ammonium chloride fumes, as pointed out, are forced out of the chamber space 9 into the outlet 7. A conduit 12 guides the fumes into either one of a pair of condensing chambers 13, 13'.

Thus, the fumes are led into chamber 13 through a pipe 14 and valve 15, while pipe 14' and valve 15' guide the fumes into chamber 13'. Each chamber is partly filled with water, shown by dotted lines 16, 16', the pipe outlets in each chamber terminating below the water level. Any well known type of vacuum producing mechanism, conventionally represented by the numeral 17, provides suction for the chambers 13 and 13', as shown, thereby facilitating the sweeping of fumes from the conversion chamber into the condensing chambers.

The chambers 13, 13' are operated alternately. That is, while the fumes are being condensed in one chamber, the other chamber is being emptied. Thus, assuming chamber 13 to be condensing fumes, the valve 15 would be open, while the valve 15' would be shut. Each chamber is provided at its top with any well known type of water spraying device 18, 18' it being understood that when fumes enter a chamber they are cooled and instantly dissolved in the fine spray through which they must pass.

When a chamber, say 13, contains a sufficiently saturated solution of ammonium chloride, the valve 15 is shut, valve 19 opened, valve 15' opened, and valve 19' closed. A pump 20, preferably a centrifugal type of pump, is connected through the valves 19, 19' to the outlets of the chambers 13, 13'. The pump 20 discharges solution, through conduit 21, into an ammonia distilling chamber 22 through an inlet 23.

Through a hopper 24, at the top of the chamber 22, there is continuously fed calcium oxide (CaO) into the chamber. The oxide is slaked by the water of the ammonium chloride solution, and the resulting reaction follows the following equation:

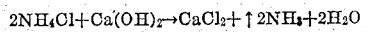

$$2NH_4Cl + Ca(OH)_2 \rightarrow CaCl_2 + \uparrow 2NH_3 + 2H_2O$$

The liberated ammonia gas is permitted to escape through the outlet 25. An outlet 26 provides for the removal of the calcium chloride solution.

The liberated ammonia gas is passed into a sulphuric acid absorption chamber 27 constructed in any manner well known to those skilled in the art. The sulphuric acid is sprayed into the chamber 27, by any desired acid spray device 28, through the top of the chamber. The resulting ammonium sulphate is produced according to the following equation:

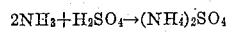

$$2NH_3 + H_2SO_4 \rightarrow (NH_4)_2SO_4$$

An outlet 29 permits removal of the ammonium sulphate, the latter being removed to conventional crystallizing and drying arrangements 30. The dried ammonium sulphate material is then fed back into the hopper 5 with fresh quantities of potassium chloride. A continuous, and complete, cycle is thereby established for the conversion of potassium chloride into potassium sulphate, and the utilization of conversion by-products in producing ammonium sulphate.

Another important advantage of the present process resides in the fact that a portion or all of the liberated ammonia gas of chamber 22 may be diverted for use in the production of potassium nitrate from the potassium sulphate. Thus, by oxidizing the ammonia to form nitric acid, according to methods well known to those skilled in the art, the acid may be used for dissolving calcium carbonate according to the equation:

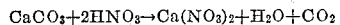

$$CaCO_3 + 2HNO_3 \rightarrow Ca(NO_3)_2 + H_2O + CO_2$$

The calcium nitrate solution is, then reacted with potassium sulphate, issuing through outlet 8, according to the following equation:

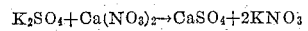

$$K_2SO_4 + Ca(NO_3)_2 \rightarrow CaSO_4 + 2KNO_3$$

The aforementioned reaction has been disclosed in my said co-pending application, and is claimed therein. It is mentioned herein to demonstrate the manner in which the potassium sulphate produced by the present process is converted into the desirable potassium nitrate.

While I have indicated and described only one arrangement, and series of steps, for utilizing my present discovery, it will be clear to one skilled in the art that my invention is by no means limited to the particular steps, or means, shown and described, but that many modifications, both in sequence of steps and type of apparatus, may be used without departing from the scope of my invention as set forth in the appended claim.

What I claim is:

A method of producing potassium sulphate consisting in slowly passing a reacting mixture of potassium chloride and ammonium sulphate through a zone heated at a temperature above the volatilization point of ammonium chloride and below the melting point of potassium sulphate, continuously removing the resulting potassium sulphate from said zone, also continuously removing the volatilized chloride, condensing said chloride, treating the condensed ammonium chloride with lime, absorbing the liberated ammonia in sulphuric acid and using the recovered solid ammonium sulphate for the conversion of additional quantities of potassium chloride.

AUGUST HOLZ.